United States Patent
Kagganti et al.

(10) Patent No.: US 11,627,388 B2
(45) Date of Patent: Apr. 11, 2023

(54) METHOD AND A MONITORING CAMERA

(71) Applicant: Axis AB, Lund (SE)

(72) Inventors: Shiva-Prasad Kagganti, Lund (SE); Madhavi Kagganti, Lund (SE)

(73) Assignee: AXIS AB, Lund (SE)

( * ) Notice: Subject to any disclaimer, the term of this patent is extended or adjusted under 35 U.S.C. 154(b) by 66 days.

(21) Appl. No.: 17/353,823

(22) Filed: Jun. 22, 2021

(65) Prior Publication Data

US 2022/0006953 A1 Jan. 6, 2022

(30) Foreign Application Priority Data

Jul. 2, 2020 (EP) .................................... 20183592

(51) Int. Cl.
*H04N 23/65* (2023.01)
*G06F 1/24* (2006.01)
*G06F 1/26* (2006.01)
*H04N 23/661* (2023.01)

(52) U.S. Cl.
CPC .............. *H04N 23/65* (2023.01); *G06F 1/24* (2013.01); *G06F 1/26* (2013.01); *H04N 23/661* (2023.01)

(58) Field of Classification Search
CPC ........... H04N 5/23241; H04N 5/23206; H04N 7/181; H04N 5/232411; H04N 5/247; H04N 23/65; H04N 23/661; H04N 23/651; H04N 23/90; G06F 1/24; G06F 1/26; G06F 9/4401; H04L 67/535; H04L 67/61

See application file for complete search history.

(56) References Cited

U.S. PATENT DOCUMENTS

| | | | |
|---|---|---|---|
| 10,778,887 B1 * | 9/2020 | Xu | H04N 5/23219 |
| 2019/0132504 A1 | 5/2019 | Fowers | |
| 2019/0191079 A1 * | 6/2019 | Mehta | H04N 5/23229 |

FOREIGN PATENT DOCUMENTS

| | | | | |
|---|---|---|---|---|
| EP | 3588845 A1 * | 1/2020 | | G06F 1/266 |
| EP | 3588845 A1 | 1/2020 | | |

* cited by examiner

*Primary Examiner* — Timothy J Henn
(74) *Attorney, Agent, or Firm* — Xsensus LLP (57) ABSTRACT

The present disclosure relates to a method performed by a first monitoring camera (101) for handling startup. The first monitoring camera (101) detects that a power supply state of has changed from off to on. The first monitoring camera (101) initiates startup of a first part (103a) when the power supply state is on. When the startup is complete, the first monitoring camera (101) determines if its first startup priority is higher than, lower than or the same as a second startup priority of a second monitoring camera (110). The first monitoring camera (101) initiates startup of its second part (105a) if the first startup priority is higher or the same as the second startup priority. If the first startup priority is lower than the second startup priority, the first monitoring camera (101) delays startup of its second part (105a) until startup instructions have been received.

11 Claims, 2 Drawing Sheets

METHOD AND A MONITORING CAMERA

CROSS-REFERENCE TO RELATED APPLICATION

This application claims priority to European Patent Application No. 20183592.3, filed on Jul. 2, 2020, the entire disclosure of which is incorporated by reference herein.

TECHNICAL FIELD

The present disclosure relate generally to a first monitoring camera and a method performed by the first monitoring camera. More particularly the present disclosure relates to handling startup of the first monitoring camera.

BACKGROUND

Video surveillance is commonly used for example in surveillance of commercial, industrial and private locations. Monitoring cameras used in video surveillance is typically powered using Power over Ethernet (PoE), i.e. providing both power and data via an Ethernet cable. The number of monitoring cameras used in video surveillance is increasing, which also increases the amount of power needed to startup and to run these monitoring cameras.

A monitoring camera may lose its power due to a power outage. For a video surveillance system with a network of monitoring cameras, i.e. a plurality of monitoring cameras, restarting all monitoring cameras after the power is restored may require a large amount of power. If the power outage covered a whole city, the city's power grid will experience a very high load when the power is restored since all power consuming devices, including the monitoring cameras will require power at the same time. The amount of power used for starting up may be higher than the ordinary power used to run a certain device. This high load may lead to an overload, an unstable power supply, another power outage etc. Therefore, it is important that the video surveillance system contributes in requiring as little power as possible when it starts up again after the power has been off.

Therefore, there is a need to at least mitigate or solve this issue.

SUMMARY

An objective of embodiments herein is therefore to obviate at least one of the above disadvantages and to provide improved handling of startup of a monitoring camera.

The object is at least partly achieved by the independent claim 1.

According to a first aspect, the object is achieved by a method performed by a first monitoring camera in a camera network for handling startup of the first monitoring camera. The first monitoring camera detects that a power supply state of the first monitoring camera has changed from off to on. When the power supply state has changed from off to on, the first monitoring camera initiates startup of a first part of the first monitoring camera. The first part comprises a processing unit, a memory unit and a network connection unit. When startup of the first part is complete, the first monitoring camera determines if a first startup priority of the first monitoring camera is higher than, lower than or the same as a second startup priority of at least one second monitoring camera. The first monitoring camera initiates startup of a second part of the first monitoring camera if the first startup priority of the first monitoring camera is higher or the same as the second startup priority of the second monitoring camera. If the first startup priority of the first monitoring camera is lower than the second startup priority of the second monitoring camera, the first monitoring camera delays startup of the second part of the first monitoring camera until startup instructions have been received from the at least one second monitoring camera.

According to a second aspect, the object is achieved by a first monitoring camera in a camera network for handling startup of the first monitoring camera. The first monitoring camera is adapted to detect that a power supply state of the first monitoring camera has changed from off to on. When the power supply state has changed from off to on, the first monitoring camera is adapted to initiate startup of a first part of the first monitoring camera. The first part comprises a processing unit, a memory unit and a network connection unit. When startup of the first part is complete, the first monitoring camera is adapted to determine if a first startup priority of the first monitoring camera is higher than, lower than or the same as a second startup priority of at least one second monitoring camera. The first monitoring camera is adapted to initiate startup of a second part of the first monitoring camera if the first startup priority of the first monitoring camera is higher or the same as the second startup priority of the second monitoring camera. If the first startup priority of the first monitoring camera is lower than the second startup priority of the second monitoring camera, the first monitoring camera is adapted to delay startup of the second part of the first monitoring camera until startup instructions have been received from the at least one second monitoring camera.

Thanks to the startup priorities of the first monitoring camera and the second monitoring camera, handling of startup of a monitoring camera is improved in that all cameras' first parts are started up when the power state changes from off to on, but the startup of the second parts are done in a prioritized order. Using other words, startup of the cameras in the camera network is done in an orderly manner with delays in order to avoid simultaneous powering up of all the cameras in the network. This way, the load on the power grid is reduced when the power changes from off to on.

The present disclosure affords many advantages, of which a non-exhaustive list of examples follows:

An advantage is that a sudden power load on the power grid is avoided or at least reduced due to the partial startup of the monitoring camera parts when the power is turned on, and starting up the remaining camera parts, i.e. the second part, according to a set order of priority. With the partial startup, a power reduction of 60-70% may be achieved compared to starting up the complete monitoring camera.

Another advantage is that monitoring cameras in high prioritized places like a building entrance or worthy goods stored area may be assigned the highest startup priority such that they are started up before other lower priority monitoring cameras, and thereby latency is avoided.

A further advantage is that high prioritized monitoring cameras start up their first and second parts first and hence are functional before low prioritized monitoring cameras start up their second parts. This way, at least high prioritized monitoring cameras get to be fully functional when the power in the net is low. Thus, low prioritized monitoring cameras may not start up their second parts and do not load the power net.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail by way of example only in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
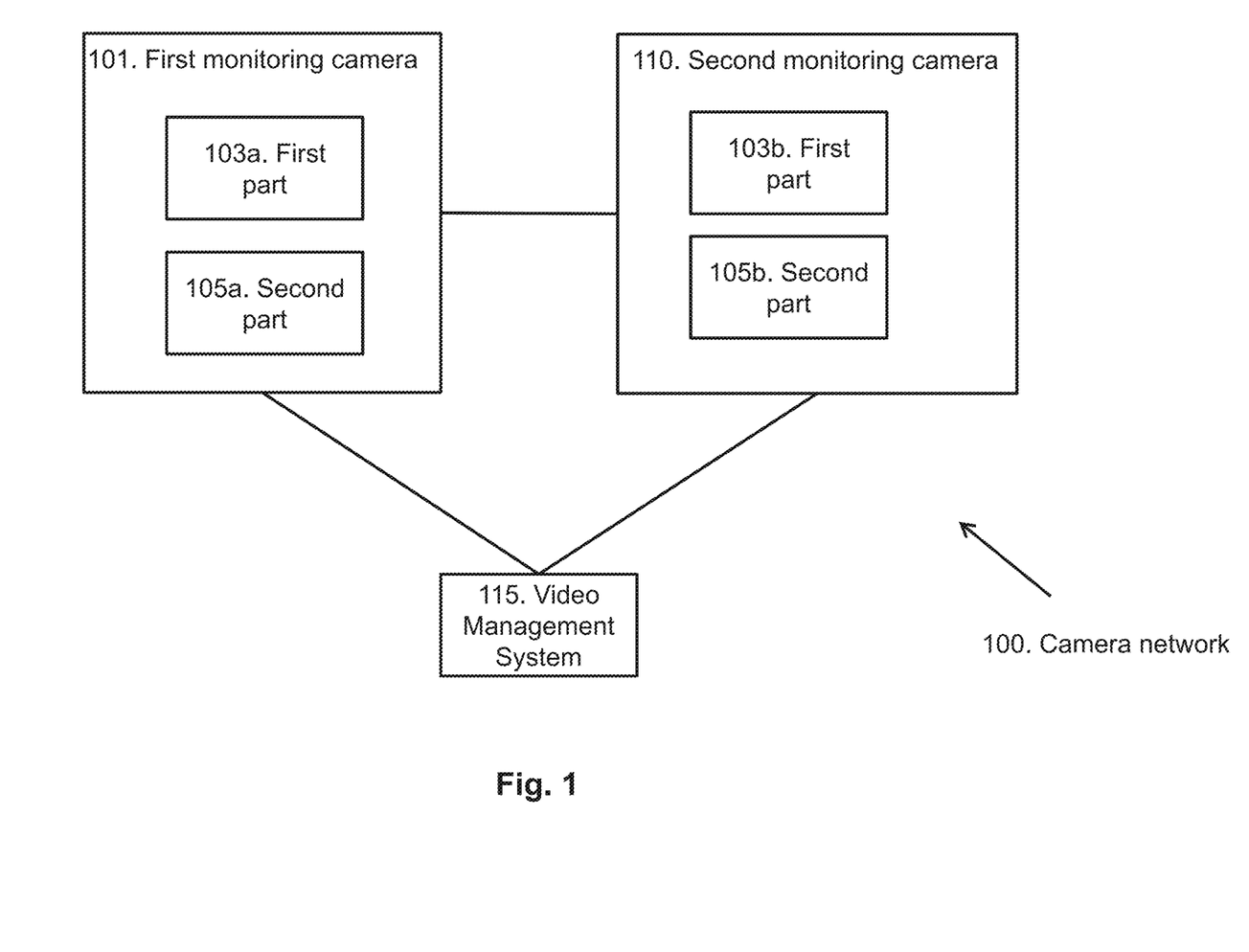
FIG. 1 is a schematic block diagram illustrating a camera network.

FIG. 1 depicts a camera network 100. The camera network 100 comprises a first monitoring camera 101. The first monitoring camera 101 may be any suitable camera adapted to monitor its' surrounding, e.g. to capture and record images of the surroundings. The first monitoring camera 101 may be referred to as a video camera, a digital monitoring camera, a digital video camera, a surveillance camera, a security camera etc.

The first monitoring camera 101 comprises a first part 103a and a second part 105a. The first part 103a of the first monitoring camera 101 comprises a processing unit, a memory unit and a network connection unit. The first part 103a may comprise additional components in addition to the ones mentioned above.

The processing unit of the first monitoring camera 101 is adapted to process data, e.g. images, captured by the first monitoring camera 101. The processing unit may be for example a Digital Signal Processor (DSP), Application Specific Integrated Circuit (ASIC) processor, Field-Programmable Gate Array (FPGA) processor or microprocessor. The memory unit of the first monitoring camera 101 comprises instructions executable by the processor. The memory unit is arranged to store data, received data streams, priorities, threshold values, time periods, configurations, schedulings, and applications to perform the methods described herein when being executed in the first monitoring camera 101.

The network connection unit of the first monitoring camera 101 is adapted to provide connection to an external data network, i.e. to enable data transfer between the data network and the first monitoring camera 101, and to also provide power to the first monitoring camera 101. The first monitoring camera 101 is adapted to be powered via PoE. The network connection unit may be an Ethernet cable. When the first part 103a of the first monitoring camera 101 has started up, the first monitoring camera 101 may be considered to be on and ready for starting up its second part 105a.

The second part 105a of the first monitoring camera 101 comprises a picture sensor, a lens controller, Infra-red (IR) emitter and IR receiver, heater unit, audio unit, camera control unit like panning function, tilting function, analytics unit, recording unit and a video streaming unit. The lens controller may have functions such as focus, zoom, iris etc. When the second part 105a has started up, the first monitoring camera 101 is ready to start monitoring, e.g. to start image processing of images, streaming of images etc. The second part 105a may comprise additional components in addition to the ones mentioned above.

The first monitoring camera 101 comprises a communication interface configured to facilitate communications between the first monitoring camera 101 and other monitoring cameras, e.g., the second monitoring camera 110, a video management system 115 which will be described in more detail later, or another device. The communication interface is the network connection unit of the first part 103a of the first monitoring camera 101. The communication interface of the first monitoring camera 101 may comprise a transceiver or a transmitter and a receiver configured to transmit and receive signals over a radio link in accordance with a suitable standard, e.g. WiFi, Bluetooth, a suitable cellular technology such as 4G or 5G communication etc. The communication interface may be a wired or a wireless communication interface.

The first monitoring camera 101 is associated with a first startup priority. The first startup priority indicates a priority of when the second part 105a of the first monitoring camera 101 is allowed to startup compared to other monitoring cameras in the camera network 100. The first startup priority may be for example a number between 0 and 5, where 0 is the highest priority and 5 is the lowest priority, or where 5 is the highest priority and 0 is the lowest priority. The first startup priority will be described in more detail later.

The camera network 100 comprises at least one second monitoring camera 110. The term "at least one" comprises one, two or more second monitoring cameras 110. The second monitoring camera 110 may be any suitable camera adapted to monitor its' surrounding, e.g. to capture and record images of the surroundings. The second monitoring camera 110 may be referred to as a video camera, a digital monitoring camera, a digital video camera, a surveillance camera, a security camera etc. The second monitoring camera 110 comprises a first part 103b and a second part 105b.

The first part 103b of the second monitoring camera 110 is substantially the same as and/or similar to the first part 103a of the first monitoring camera 101, and the second part 105b of the second monitoring camera 110 is substantially the same as and/or similar to the second part 105a of the first monitoring camera 101.

The first part 103b of the second monitoring camera 110 comprises a processing unit, a memory unit and a network connection unit. The processing unit of the second monitoring camera 110 is adapted to process data, e.g. images, captured by the second monitoring camera 110. The processing unit may be for example a Digital Signal Processor (DSP), Application Specific Integrated Circuit (ASIC) processor, Field-Programmable Gate Array (FPGA) processor or microprocessor. The memory unit of the second monitoring camera 110 comprises instructions executable by the processor. The memory unit is arranged to store data, received data streams, priorities, threshold values, time periods, configurations, schedulings, and applications to perform the methods described herein when being executed in the second monitoring camera 110.

The network connection unit of the second monitoring camera 110 is adapted to provide connection to an external data network, i.e. to enable data transfer between the data network and the second monitoring camera 110, and to also provide power to the second monitoring camera 110. The second monitoring camera 110 is adapted to be powered via PoE. The network connection unit may be an Ethernet cable. When the first part 103b of the second monitoring camera 110 has started up, the second monitoring camera 110 may be considered to be on and ready for starting up the second part 105b of the second monitoring camera 110.

The second part 105b of the second monitoring camera 110 comprises a picture sensor, a lens controller, IR emitter and IR receiver, heater unit, audio unit, camera control unit like panning function, tilting function, analytics unit, recording unit and a video streaming unit. The lens controller may have functions such as focus, zoom, iris etc. When the second part 105b has started up, the second monitoring camera 110 is ready to start monitoring, e.g. to start image processing of images, streaming of images etc. The second part 105b may comprise additional components in addition to the ones mentioned above.

The second monitoring camera 110 comprises a communication interface configured to facilitate communications between the second monitoring camera 110 and other monitoring cameras, e.g., the first monitoring camera 101, the video management system 115, or another device. The communication interface is the network connection unit of the first part 103b of the second monitoring camera 110. The communication interface of the second monitoring camera 110 may comprise a transceiver or a transmitter and a receiver configured to transmit and receive signals over a radio link in accordance with a suitable standard, e.g. WiFi, Bluetooth, any suitable cellular technology such as 4G or 5G communication etc. The communication interface may be a wired or a wireless communication interface.

The second monitoring camera 110 is associated with a second startup priority. The second startup priority indicates a priority of when the second part 105b of the second monitoring camera 110 is allowed to startup compared to other monitoring cameras in the camera network 100. The second startup priority may be for example a number between 0 and 5, where 0 is the highest priority and 5 is the lowest priority, or where 5 is the highest priority and 0 is the lowest priority. The second startup priority will be described in more detail later.

When the term monitoring camera is used herein without the terms first or second, it refers to any of the first monitoring camera 101 and second monitoring camera 110.

Even though FIG. 1 illustrates two monitoring cameras 101, 110, the camera network 100 may comprise any suitable N number of monitoring cameras, where N is a positive integer. Two monitoring cameras 101, 110 are shown in FIG. 1 for the sake of simplicity. All monitoring cameras 101, 110 in the camera network 100 are adapted to communicate with each other using any suitable wired or wireless communication technology.

The camera network 100 may comprise and/or may be connected to a video management system 115, e.g. a local video management system 115 and/or a central video management system 115. The video management system 115 is adapted to communicate with the first monitoring camera 101 and the second monitoring camera 110 using any suitable wired or wireless communication technology. The video management system 115 may be a computer, a mobile phone etc. The video management system 115 may be adapted to manage and control the first monitoring camera 101 and the second monitoring camera 110. The video management system 115 may be adapted to receive images processed by each of the first monitoring camera 101 and the second monitoring camera 110 for further processing and analysis, for display on a screen to be viewed by an operator etc. The video management system 115 may be adapted to assign, change and control startup priorities of the monitoring cameras 101, 110 in the camera network 100, e.g. the first startup priority and the second startup priority. The startup priorities may not necessarily be set by the video management system 115. The startup priorities may be set when the monitoring cameras 101, 110 are installed, i.e. before the power is lost. The video management system 115 may comprise a list of the startup priorities of all monitoring cameras 101, 110 in the camera network 100. The list may be stored in a local memory comprised in the video management system 115 or in a cloud memory which is accessible by the video management system 115.

The camera network 100 comprising the first monitoring camera 101, the second monitoring camera 110 and the video management system 115 may be a local network, where a local network refers to area network under the same router. A local network may be for example an industrial factory, an office building, a department store etc. In a local network, it is easy for the monitoring cameras 101, 110 to communicate with each other due to the short distance between them. A local video management system 115 in the local network may control the startup sequence of the second parts 105a, 105b of the first and second monitoring cameras 101, 110. When a monitoring camera 101, 110 has started up completely, i.e. both the first and second parts 103, 105 have started up, then a video may be streamed to a central video management system 115. For example, a company with several factories at different locations may have one common video management system 115 located at a main factory or at some other central office of the factory. In addition or instead, there may be local video management systems 115 at each factory.

The method performed by the first monitoring camera 101 in the camera network 100 for handling startup of the first monitoring camera 101 will now be described with reference to the flow chart in FIG. 2. The steps of the method in FIG. 2 may be taken in any suitable order, one or more steps may be performed simultaneously, or in alternate order where applicable. The method, which may be continuously repeated, comprises at least one of the following steps:

Step 200

The first monitoring camera 101 detects that a power supply state of the first monitoring camera 101 has changed from off to on.

Step 201

The first monitoring camera 101 initiates startup of a first part 103a of the first monitoring camera 101 when the power supply state has changed from off to on. The first part 103a comprises the processing unit, the memory unit and the network connection unit.

Step 202

When the power supply state has changed from off to on, the first monitoring camera 101 may transmit information indicating the first startup priority and a first network address of the first monitoring camera 101 to the at least one second monitoring camera 110. The information indicating the first startup priority and a first network address may be comprised in a camera advertise message. The first network address may be a first Internet Protocol (IP) address or any other suitable network address type. The information may comprise the actual first startup priority and the first network address may be comprised in the information, or the information may comprise an indication, e.g. an address, of where the first startup priority and the first network address can be obtained, e.g. a camera network memory, a cloud storage located outside the camera network 100 etc.

Step 203

The first monitoring camera 101 may receive information indicating the second startup priority and a second network address from the at least one second monitoring camera 110.

The information indicating the first startup priority and a first network address may be comprised in a camera advertise message. The second network address may be a second IP address or any other suitable network address type. The information may comprise the actual second startup priority and the second network address may be comprised in the information, or the information may comprise an indication, e.g. an address, from where the second startup priority and the second network address can be obtained, e.g. a camera network memory, a cloud storage etc.

Step 204

When startup of the first part 103a is complete, the first monitoring camera 101 determines if a first startup priority of the first monitoring camera 101 is higher than, lower than or the same as a second startup priority of at least one second monitoring camera 110 in the camera network 100. The first startup priority may be preconfigured in the first monitoring camera 101, it may be dynamically assigned to the first monitoring camera 101, e.g. by the video management system 115 or by a master monitoring camera etc.

Step 205

The first monitoring camera 101 initiates startup of a second part 105a of the first monitoring camera 101 if the first startup priority of the first monitoring camera 101 is higher or the same as the second startup priority of the second monitoring camera 110. The second part 105a of the first monitoring camera 101 may comprise a picture sensor, a lens controller and a video streaming unit.

Step 206

If the first startup priority of the first monitoring camera 101 is lower than the second startup priority of the second monitoring camera 110, the first monitoring camera 101 delays startup of the second part 105a of the first monitoring camera 101 until startup instructions have been received from the at least one second monitoring camera 110.

Step 207

The first monitoring camera 101 may receive startup instructions from the at least one second monitoring camera 110. The startup instructions may indicate that the at least one second monitoring camera 110 has completed startup of its second part 105b. The startup instructions may be a camera status ready message.

Step 208

The first monitoring camera 101 may initiate startup of the second part 105a of the first monitoring camera 101 when the startup instructions have been received.

Step 209

When the startup of the second part 105a of the first monitoring camera 101 is completed, the first monitoring camera 101 may transmit startup complete information to the at least one second monitoring camera 110 which indicates that the first monitoring camera 101 has completed startup of its second part 105a. The startup complete information may be a system ready message.

Step 210

The first monitoring camera 101 may transmit startup failure information to the at least one second monitoring camera 110 if the initiated startup of the first part 103a of the first monitoring camera 101 was not completed. The startup failure information may be a camera time out message. The startup failure information may be sent to the video management system 115. The failure may be due to e.g. a low voltage, or some other problem.

The first monitoring camera 101 is adapted to perform the method described above for FIG. 2.

A computer program may comprise instructions which, when executed on at least one processor, cause the at least one processor to carry out at least one of the method steps 200-210. A carrier may comprise the computer program, and the carrier is one of an electronic signal, optical signal, radio signal or computer readable storage medium.

After the power has been turned on, all monitoring cameras 101, 110 start up their respective first parts 103a, 103b with the processor, memory unit and components to connect to the network and they are ready to communicate in the local network. The startup of the second parts 105a, 105b are delayed, i.e. the picture sensor, lens control, streaming of video etc. In this way, the load on the power net is reduced to some extent by not starting all monitoring cameras 101, 110 completely at the same instant of time and thus load the power net.

The first monitoring camera 101 and the at least one second monitoring camera 110 are assigned with a startup priority, i.e. the first startup priority and the second startup priority. The first monitoring camera 101 and the at least one second monitoring camera 110 may be adapted to set their own startup priority number at the installation or, the startup priority number may be handled by the video management system 115, e.g. a computer that controls all monitoring cameras 101, 110 in the camera network 100. The startup priority may be a number in the range of for example 0-5, 0-10, 0-50 etc. The monitoring camera with Startup priority 0 may be the highest priority for starting its second part 105a, 105b first compared to a monitoring camera with startup priority 5 having lowest priority. Startup priority 0, i.e. the highest priority, may be a default setting in the first monitoring camera 101 and the at least one second monitoring camera 110. The first startup priority and the second startup priority may be dynamically changed, e.g. by the video management system 115.

Each of the first monitoring camera 101 and the at least one second monitoring camera 110 may take approximately 60 secs to make a complete start after power up, i.e. it may take approximately 60 secs to startup the second part 105a, 105b. In the above example, the monitoring camera with startup priority 5 may have completed its start up after 300 secs (5 minutes). Monitoring cameras 101, 110 with the same startup priority number may begin the startup of their second parts 105a, 105b at the same time.

If the first monitoring camera 101 and the at least one second monitoring camera 110 are in different power grids but the same network, then the first monitoring camera 101 and the at least one second monitoring camera 110 may have the same startup priority number to reduce start time of the first monitoring camera 101 and the at least one second monitoring camera 110.

The communication between the first monitoring camera 101 and the at least one second monitoring camera 110 may comprise at least one of the following signals:

Camera advertise signal—Step 202—Indicates the presence of a monitoring camera 101, 110 in the camera network 100 and has started up the first part 103a, 103b of the monitoring cameras 101 and 110, e.g. an Internet local network.

Camera Enquiry signal—The monitoring camera enquires status to get information about if the monitoring camera 101, 110 has completed start up of the second part 105a, 105b.

Camera Status Ready signal—Step 207—Indicates that the monitoring camera 101, 110 has completed start up of both the first part 103a, 103b and the second part 105a, 105b.

Camera Time Out signal—Step 210—Indicates that the monitoring camera 101, 110 failed to complete the start up of the second part 105*a*, 105*b*.

Camera Acknowledge signal—Step 202*a*—Indicates to high priority monitoring camera 101, that the monitoring camera 110 with low priority is present in the camera network 100 and is ready to start after the high priority camera 101 has completed start up or had problem of the second part 105*a* and has sent out either Status Ready signal in step 207 or a Time Out signal in step 210.

Figure 2:
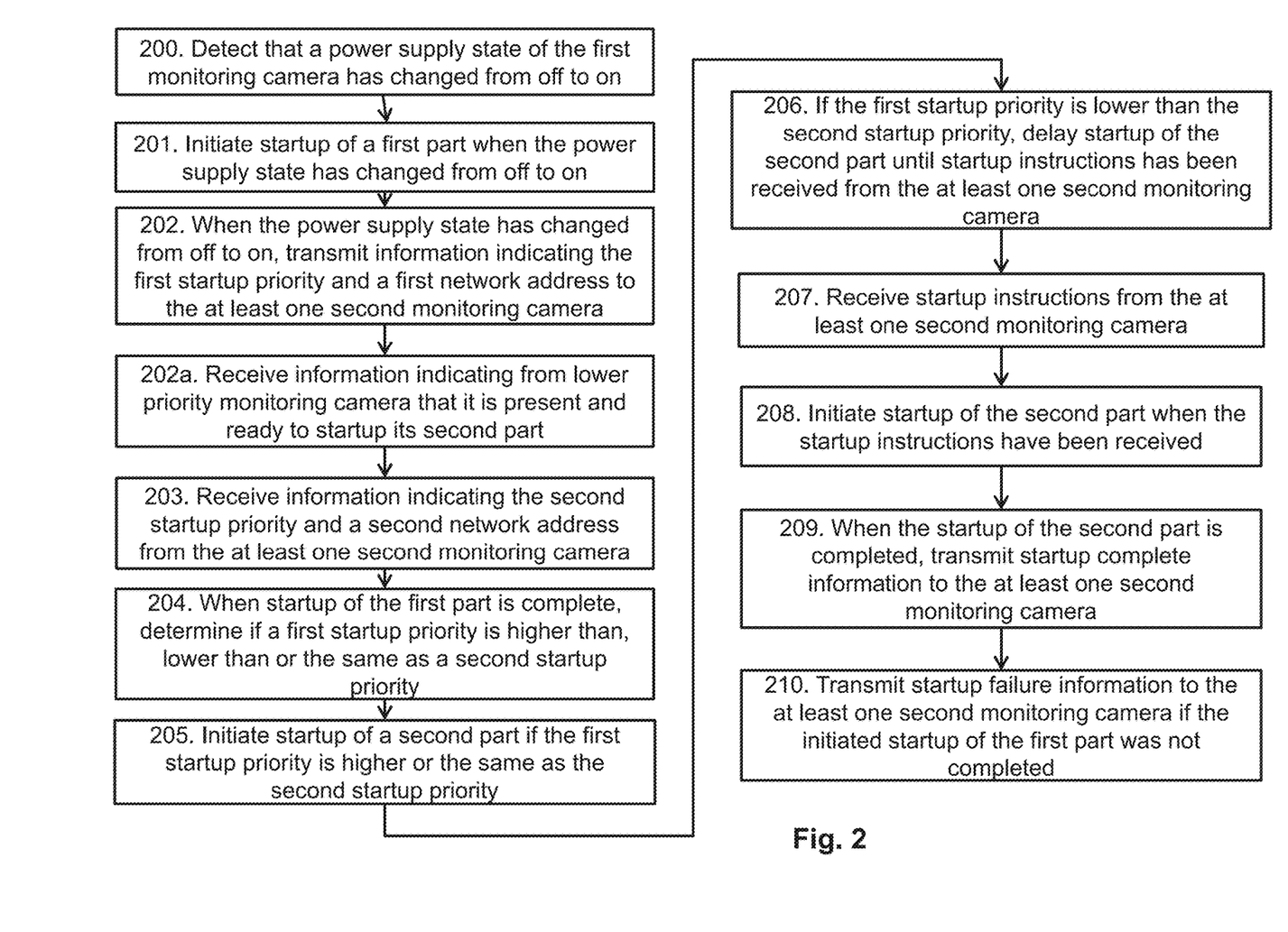
FIG. 2 is a flow chart illustrating a method.

When the power is turned on, e.g. it is restored after a power outage, the first monitoring camera 101 and the at least one second monitoring camera 110 in the camera network 100, e.g. in the local network, advertise their startup priority and network address, e.g. IP address, steps 202 and 203 in FIG. 2. All other monitoring cameras 101, 110 note down the startup priority and network address and thus later communications can be one to one monitoring camera. The Status Ready and Time Out signals may be sent to the video management system 115, the customer, the installer etc. in order to provide information about which monitoring camera 101, 110 is functioning and/or not started, respectively. The Camera Enquiry signal may be sent from the monitoring camera 101 that is waiting to start its second part 105 from a higher priority camera 110. This enquiry signal can be sent to the video management system 115, the customer, the installer etc. that helps in trouble shooting if any monitoring camera 101, 110 is malfunctioning and is unable to send the Status Ready signal or the Time Out signal.

Some example scenarios of the camera network with different number of monitoring cameras 101, 110 and with different startup priorities will now be described. First, a scenario with two monitoring cameras 101, 110 in the camera network 100 will be described. Then, a scenario with four monitoring cameras 101, 110 in the camera network 100 will be described. The first startup priority and the second startup priority may be any number between 0 and 5, where 0 is the highest priority and 5 is the lowest priority. In the below example scenarios, the startup priorities will be referred to as Prio, for the sake of simplicity.

1. Two Monitoring Cameras

In this scenario, the camera network 100 comprises two monitoring cameras 101, 110: One first monitoring camera 101 and one second monitoring camera 110. The first monitoring camera 101 has a first startup priority and the second monitoring camera 110 has a second startup priority. The first startup priority and the second startup priority may have the same or different value, and some of these alternatives are described below in items 1.1-1.5.

1.1. Prio 0 and Prio 1

The first monitoring camera 101 has a first startup priority with the value 0, i.e. Prio 0. The second monitoring camera 110 has a second startup priority with the value 1, i.e. Prio 1.

The first monitoring camera 101 and the second monitoring camera 110 may, at start after the power has been turned on, advertise their startup priority numbers and network address to each other when the power is turned on. The second monitoring camera 110 with Prio 1 may acknowledge to the first monitoring camera with Prio 0. The second monitoring camera 110 with Prio 1 starts up its second part 105*b* after the first monitoring camera 101 with Prio 0 has sent out a Status Ready message to the second monitoring camera 110 with Prio 1. The 25 second monitoring camera 110 with Prio 1 may start its second part 105*b* and send out a Status Ready message when it has completed start up of the second part 105*b*.

1.2. Prio 0 and Prio1, Monitoring Camera with Prio 0 Malfunctions or Removed

The first monitoring camera 101 has a first startup priority with the value 0, i.e. Prio 0. The second monitoring camera 110 has a second startup priority with the value 1, i.e. Prio 1. The first monitoring camera 101 with Prio 0 is removed from the camera network 100, it malfunctions or it does not complete the startup of the first part 103*a* before the power state changes from off to on.

1.2.1. Monitoring Camera with Prio 0 Removed

If the first monitoring camera 101 with Prio 0 is removed from the camera network 100, the first monitoring camera 101 with Prio 0 does not advertise its first startup priority and network address due to it being removed from camera network 100. The second monitoring camera 110 with Prio 1 does not receive any other camera presence signal. Hence, the second monitoring camera 110 with Prio 1 continues to start up its second part 105*b* without waiting for any instructions from the first monitoring camera 101.

1.2.2. Monitoring Camera with Prio 0 Malfunctioning

If the first monitoring camera 101 with Prio 0 malfunctions, it may advertise its startup priority number and network address to the second monitoring camera 110 when the power is turned on. However, the first monitoring camera 101 does not start its second part 105*a* due to the malfunction. The first monitoring camera 101 with Prio 0 may send out a time out signal to the second monitoring camera 110 with Prio 1. When the second monitoring camera 110 receives information about the malfunction of the first monitoring camera 101, the second monitoring camera 110 with Prio 1 may startup its second part 105*b*, without waiting for the first monitoring camera 101 to complete the startup of its second part 105*a*.

1.2.3. Monitoring Camera 101 with Prio 0 does not Start Completely

The first monitoring camera 101 with Prio 0 advertises its startup priority number and network address to the second monitoring camera 110, but does not complete the startup of the second part 105*a*. The first monitoring camera 101 does not send out any time out signal to the second monitoring camera 110. The second monitoring camera 110 with Prio 1 may enquire the first monitoring camera 101 about its startup status. If the second monitoring camera 110 with Prio 1 does not receive any status ready or time out message, the second monitoring camera 110 with Prio1 waits, i.e. it delays startup of its second part 105*b*. The enquiry signal from the second monitoring camera 110 for startup status may assist installer or customer in searching for a possible error in the camera network 100.

1.3. Prio 0 and Prio 1, Monitoring Camera with Prio 1 Malfunctions or Removed

The first monitoring camera 101 has a first startup priority with the value 0, i.e. Prio 0. The second monitoring camera 110 has a second startup priority with the value 1, i.e. Prio 1.

The first monitoring camera 101 with Prio 0 advertises its Prio 0 and first network address. Because of absence of any acknowledge signal from the second monitoring camera 110, the first monitoring camera 101 with Prio 0 sends out a Status Ready signal to the second monitoring camera 110 after complete start of the second part 105*a*. If the second monitoring camera 110 with the Prio 1 malfunctions after it has sent an acknowledge signal to the first monitoring camera 101 with the Prio 0, the first monitoring camera 101 with Prio 0 send out a Status Ready signal. The second monitoring camera 110 with Prio1 does not start its second part 105b because of its own malfunction problem, and may send out a Time Out signal to the first monitoring camera 101.

1.4. Both Monitoring Cameras with Prio 0

The first monitoring camera 101 has a first startup priority with the value 0, i.e. Prio 0. The second monitoring camera 110 has a second startup priority with the value 0, i.e. Prio 0. The first monitoring camera 101 and the second monitoring camera 110 both have Prio 0 which is the highest priority.

The first monitoring camera 101 and the second monitoring camera 110 advertise their startup priorities and network addresses when the power is turned on. Both the first monitoring camera 101 and the second monitoring camera 110 understand that they have same startup priority and will startup their second parts 105a, 105b and send out a Status Ready signal when the startup is complete.

1.5. Both Monitoring Cameras with Prio 1

The first monitoring camera 101 has a first startup priority with the value 1, i.e. Prio 1. The second monitoring camera 110 has a second startup priority with the value 1, i.e. Prio 1. The first monitoring camera 101 and the second monitoring camera 110 both have Prio 1 which is the second highest priority.

The first monitoring camera 101 and the second monitoring camera 110 advertise their presence by sending their startup priority and network address to each other when the power is turned on. Both the first monitoring camera 101 and the second monitoring camera 110 understand that they have same startup priority, i.e. Prio 1, and that they have not received any advert from higher priority cameras. They immediately make a complete start by starting up their second parts 105a, 105b without delay and send out a Status Ready signal when startup of the second part 105a, 105b is completed.

2. Four Monitoring Cameras

In this scenario, the camera network 100 comprises four monitoring cameras 101, 110:

one first monitoring camera 101 and three second monitoring camera 110. The first monitoring camera 101 has a first startup priority and each of the second monitoring cameras 110 has a respective second startup priority. The first startup priority and the second startup priorities may have the same or different value, and some of these alternatives are described below in items 2.1-2.5.

2.1. Monitoring Cameras with Prio 0, Prio 1, Prio 2 and Prio 3

The first monitoring camera 101 has a first startup priority with the value 0, i.e. Prio 0. Each of three second monitoring cameras 110 have a second startup priority with the value 1, 2 and 3, respectively, i.e. Prio 1, Prio 2 and Prio 3. Prio 0 is the highest priority, Prio 1 is the second highest priority, Prio 2 is the third highest priority and Prio 3 is the lowest priority.

All four monitoring cameras 101, 110 send their startup priorities and network address to each other when the power is turned on. Low prio monitoring cameras 110 may send acknowledgement signals which are noted by higher priority monitoring cameras 101, 110. After receiving a Status Ready signal or a Time out signal from a higher priority monitoring camera 101, 110, the next lower priority monitoring camera, 110 starts up its second part 105b and sends out a Status Ready signal to its next lower priority monitoring camera 110.

2.2. Monitoring Cameras with Prio 0, Prio 0, Prio 1 and Prio 2

The first monitoring camera 101 has a first startup priority with the value 0, i.e. Prio 0. Each of three second monitoring cameras 110 have a second startup priority with the value 0, 1 and 2, respectively, i.e. Prio 0, Prio 1 and Prio 2. Prio 0 is the highest priority, Prio 1 is the second highest priority, Prio 2 is the lowest priority.

All four monitoring cameras 101, 110 send their startup priorities and network address to each other when the power is turned on. Low prio monitoring cameras 110 may send acknowledgement signals to higher priority monitoring cameras 101, 110.

Both monitoring cameras 101, 110 with Prio 0 start up their second parts 105a, 105b at the same time. The second monitoring camera 110 with Prio 1 waits for a start ready signal or a time out signal from both monitoring cameras 101, 110 with Prio 0. If the second monitoring camera 110 with Prio 1 does not receive a status ready signal or a time out signal, it may send out an enquire status signal to the monitoring cameras 101, 110 with Prio 0. The second monitoring camera 110 with Prio 1 waits for a Status Ready signal or a Time out signal from both monitoring cameras 101, 110 with Prio 0 before it can start up its second part 105b.

When the second monitoring camera 110 with Prio 1 receives the Status Ready signal or the Time out signal, it starts up the second part 105b and sends out a status ready signal to the second monitoring camera 110 with Prio 2 when the startup is complete.

If the second monitoring camera 110 with Prio 1 does not receive a Status Ready signal or a Time out signal, the second monitoring camera 110 with Prio 1 may delay the startup of the second part 105b. Consequently, the second monitoring camera 110 with Prio 2 also waits with startup of its second part 105b.

2.3. Monitoring Cameras with Prio 0, Prio 1, Prio 1, Prio 2

The first monitoring camera 101 has a first startup priority with the value 0, i.e. Prio 0. Each of three second monitoring cameras 110 have a second startup priority with the value 1, 1 and 2, respectively, i.e. Prio 1, Prio 1 and Prio 2. Prio 0 is the highest priority, Prio 1 is the second highest priority, Prio 2 is the lowest priority.

All four monitoring cameras 101, 110 send their startup priorities and network address to each other when the power is turned on. Low prio monitoring cameras 110 may send acknowledgement signals to higher priority monitoring cameras 101, 110.

The first monitoring camera 101 with Prio 0 starts up its second parts 105a, i.e. it starts up completely, and sends out a Status Ready signal. Next, both second monitoring cameras 110 with Prio 1 starts up their second parts 105b at the same time. The second monitoring cameras 110 with Prio 1 send out Status Ready signals when they have completed the startup of their second parts 105b. Next, the second monitoring camera 110 with Prio 2 starts up its second part 105b, i.e. it starts up completely.

2.4. Monitoring Cameras with Prio 0, Prio 1, Prio 2 and Prio 3. Prio 1 Malfunctions The first monitoring camera 101 has a first startup priority with the value 0, i.e. Prio 0. Each of three second monitoring cameras 110 have a second startup priority with the value 1, 2 and 3, respectively, i.e. Prio 1, Prio 2 and Prio 3. Prio 0 is the highest priority, Prio 1 is the second highest priority, Prio 2 is the third highest priority and Prio 3 is the lowest priority.

All four monitoring cameras 101, 110 send their startup priorities and network address to each other when the power is turned on. Low prio monitoring cameras 110 may send acknowledgement signals to higher priority monitoring cameras 101, 110.

The first monitoring camera 101 with Prio 0 starts up its second parts 105*a*, i.e. it starts up completely, and sends out a Status Ready signal. The second monitoring camera 110 with Prio 1 malfunctions and sends out a Time out signal to the second monitoring cameras 110 with lower priority than itself. The second monitoring cameras 110 with Prio 2 and Prio 3 receive the Time out signal and start up their second parts 105*b* in in order of priority.

2.5. Monitoring Cameras with Prio 0, Prio 1, Prio 2 and Prio 3. Prio 1 Added to the Camera Network after Repair or is a New Monitoring Camera.

The first monitoring camera 101 has a first startup priority with the value 0, i.e. Prio 0. Each of three second monitoring cameras 110 have a second startup priority with the value 1, 2 and 3, respectively, i.e. Prio 1, Prio 2 and Prio 3. Prio 0 is the highest priority, Prio 1 is the second highest priority, Prio 2 is the third highest priority and Prio 3 is the lowest priority. The second monitoring camera 110 with Prio 1 is re-inserted into the camera network 100 after a repair, or it may be a newly added second monitoring camera 110 which has not previously been part of the camera network 100 when all monitoring cameras 101, 110 in the camera network 100 are functioning normally.

All four monitoring cameras 101, 110 send their startup priorities and network address to each other when the power is turned on. All monitoring cameras 101, 110 may send acknowledgement signals to higher priority monitoring cameras 101, 110, and the startup priorities and network addresses are noted by the next higher and next lower priority monitoring cameras 101, 110.

The first monitoring camera 101 with Prio 0 starts up its second part 105*a*, i.e. it starts up completely, and sends out a Status Ready signal when it is successfully completed. The second monitoring camera 110 with Prio 2 starts up its second part 105*b* as it knows there is no monitoring camera with Prio 1 in the camera network 100, i.e. it starts up completely, and sends out a Status Ready signal. The second monitoring camera 110 with Prio 3 starts up its second part 105*b*, i.e. it starts up completely. Then, the second monitoring camera 110 with Prio 1 is added or re-inserted into the camera network 100. The newly added second monitoring camera 110 with Prio 1 sends its second startup priority and network address to the monitoring cameras 101, 110 that are already in the camera network 100 and that have completely started up their first parts 103*a*, 103*b* and their second parts 105*a*, 105*b*. The second monitoring camera 110 with Prio 2 acknowledges to the second monitoring camera 110 with Prio 1. The first monitoring camera 101 with Prio 0 sends out status ready signal. The second monitoring camera 110 with Prio 1 starts up its second part 105*b*, i.e. it starts up completely, and sends out a Status Ready to the second monitoring camera 110 with Prio 2. The network address of the second monitoring camera 110 with Prio 1 is registered in the first monitoring camera 101 with Prio 0 and the second monitoring camera 110 with Prio 2.

As mentioned earlier, with the present disclosure, all monitoring cameras 101, 110 do not load the power net by attempting to start at the same time. This is enabled by that the monitoring cameras 101, 110 start in an orderly manner which may be pre-determined or dynamically assigned. The monitoring cameras 101, 110 may indicate to the video management system 115 if they have started and not started completely. If one or two monitoring cameras 101, 110 startup completely, the monitoring cameras 101, 110 with low startup priority in the priority chain will not fail to complete startup of their second parts 105*a*, 105*b*.

If a plurality of monitoring cameras 101, 110 is sending time out signals, this may be an indication of low power in the power grid. The monitoring cameras 101, 110 with lower startup priority than the ones who have sent time out signals may then not start up their second parts 105*a*, 105*b*.

If a monitoring camera 101, 110 with high priority is rebooting several times, this may be an indication of low power in the power grid. The monitoring cameras 101, 110 with lower priority than the rebooting monitoring camera 101, 110 may then not start up completely until they have received a Status Ready signal or a Time out signal from the rebooting monitoring camera 101, 110.

Some embodiments described herein may be summarised in the following manner:

The present disclosure relates to a prioritization based power distribution for monitoring cameras 101, 110 in the camera network 100 when power is turned on or reactivated e.g. after a power outage. The monitoring cameras 101, 110 are started up in an orderly manner with delays in order to avoid simultaneous powering up of all the monitoring cameras 101, 110 in the camera network 100. There is a partial startup of the monitoring cameras 101, 110 when the power state has changed from off to on by only starting the first part 103*a*, 103*b*, i.e. processing unit, memory unit and the network connection unit. The monitoring cameras 101, 110 are completely started up, i.e. their second parts 105*a*, 105*b*, e.g. i.e. image processing, video streaming and control mechanism, are started up according to a set order of startup priority to avoid sudden power load on the power grid. Lower priority monitoring cameras 101, 110 start up their second parts 105*a*, 105*b* after waiting for instructions that higher priority monitoring cameras 101, 110 have completely started up or after a predefined delay time.

The embodiments herein are not limited to the above described embodiments. Various alternatives, modifications and equivalents may be used. Therefore, the above embodiments should not be taken as limiting the scope of the embodiments, which is defined by the appended claims. A feature from one embodiment may be combined with one or more features of any other embodiment.

The term "at least one of A and B" should be understood to mean "only A, only B, or both A and B.", where A and B are any parameter, number, indication used herein etc.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A method performed by a first monitoring camera in a camera network for handling startup of the first monitoring camera, the method comprising:
   detecting that a power supply state of the first monitoring camera has changed from off to on;

initiating startup of a first part of the first monitoring camera when the power supply state has changed from off to on, wherein the first part comprises a processing unit, a memory and a network connection;

when startup of the first part is complete, determining if a first startup priority of the first monitoring camera is higher than, lower than or the same as a second startup priority of at least one second monitoring camera in the camera network;

initiating startup of a second part of the first monitoring camera under a condition that the first startup priority of the first monitoring camera is higher or the same as the second startup priority of the second monitoring camera; and under a condition that the first startup priority of the first monitoring camera is lower than the second startup priority of the second monitoring camera, delaying startup of the second part of the first monitoring camera until startup instructions have been received from the at least one second monitoring camera.

2. The method according to claim 1, comprising:
when the startup of the second part of the first monitoring camera is completed, transmitting startup complete information to the at least one second monitoring camera which indicates that the first monitoring camera has completed startup of its second part.

3. The method according to claim 1, further comprising:
receiving startup instructions from the at least one second monitoring camera, wherein the startup instructions indicate that the at least one second monitoring camera has completed startup of its second part; and
initiating startup of the second part of the first monitoring camera when the startup instructions have been received.

4. The method according to claim 1, further comprising:
transmitting startup failure information to the at least one second monitoring camera under a condition the initiated startup of the first part of the first monitoring camera was not completed.

5. The method according to claim 1, further comprising:
under a condition the power supply state has changed from off to on, transmitting information indicating the first startup priority and a first network address of the first monitoring camera to the at least one second monitoring camera; and receiving information indicating the second startup priority and a second network address from the at least one second monitoring camera.

6. The method according to claim 5, wherein the first network address is a first Internet Protocol, IP, address and the second network address is a second IP address.

7. The method according to claim 1, wherein the first startup priority is preconfigured in the first monitoring camera.

8. The method according to claim 1, wherein the second part of the first monitoring camera comprises a picture sensor, a lens controller and a video streaming unit.

9. The method according to claim 1, wherein the first startup priority is the highest priority by default.

10. A first monitoring camera comprising:
a non-transitory computer program storage device comprising instructions stored therein; and
at least one processor that upon execution of the instructions stored in the non- transitory computer program storage device, configures the processor to
detect that a power supply state of the first monitoring camera has changed from off to on;
initiate startup of a first part of the first monitoring camera when the power supply state has changed from off to on, wherein the first part comprises a processing unit, a memory and a network connection;
under a condition the startup of the first part is complete, determine if a first startup priority of the first monitoring camera is higher than, lower than or the same as a second startup priority of at least one second monitoring camera in the camera network;
initiate startup of a second part of the first monitoring camera under a condition that the first startup priority of the first monitoring camera is higher or the same as the second startup priority of the second monitoring camera; and
under a condition that the first startup priority of the first monitoring camera is lower than the second startup priority of the second monitoring camera, delay startup of the second part of the first monitoring camera until startup instructions have been received from the at least one second monitoring camera.

11. A non-transitory computer program storage device comprising instructions stored therein that when executed on at least one processor, cause the at least one processor to carry out the method according to claim 1.

* * * * *